(12) United States Patent
Little

(10) Patent No.: US 8,371,249 B1
(45) Date of Patent: Feb. 12, 2013

(54) SPRING LOADED DOG TOY

(76) Inventor: Cole Little, Laharpe, IL (US)

( * ) Notice: Subject to any disclaimer, the term of this patent is extended or adjusted under 35 U.S.C. 154(b) by 52 days.

(21) Appl. No.: 13/159,473

(22) Filed: Jun. 14, 2011

(51) Int. Cl.
*A01K 15/02* (2006.01)
(52) U.S. Cl. ........................ 119/708; 119/707
(58) Field of Classification Search .................. 119/708, 119/702, 707; 446/241
See application file for complete search history.

(56) References Cited

U.S. PATENT DOCUMENTS

| | | | |
|---|---|---|---|
| 4,517,922 A * | 5/1985 | Lind ............................. | 119/708 |
| 4,854,269 A * | 8/1989 | Arntzen ........................ | 119/703 |
| 4,940,018 A * | 7/1990 | Edling ......................... | 119/708 |
| 5,339,770 A * | 8/1994 | Haffner ........................ | 119/708 |
| 5,575,241 A | 11/1996 | Line | |
| 5,657,721 A * | 8/1997 | Mayfield et al. ............. | 119/707 |
| 5,829,391 A | 11/1998 | Krietzman et al. | |
| 5,881,679 A * | 3/1999 | Hann ............................ | 119/708 |
| 5,901,667 A * | 5/1999 | Kallas .......................... | 119/712 |
| 5,924,387 A | 7/1999 | Schramer | |
| 5,934,223 A * | 8/1999 | Ellery-Guy .................. | 119/702 |
| 6,085,693 A * | 7/2000 | Guerrette .................... | 119/51.03 |
| 6,227,929 B1 * | 5/2001 | Nelson et al. ................ | 446/239 |
| 6,318,300 B1 | 11/2001 | Renforth et al. | |
| 6,345,593 B1 * | 2/2002 | Stewart et al. ............... | 119/706 |
| 6,360,694 B1 * | 3/2002 | Noto ............................. | 119/707 |
| 6,408,793 B1 * | 6/2002 | Rutter .......................... | 119/400 |
| 6,474,260 B1 * | 11/2002 | Shultz ......................... | 119/51.03 |
| 6,568,353 B2 * | 5/2003 | Van Sluis ..................... | 119/702 |
| 6,575,119 B1 | 6/2003 | Lonsway | |
| 6,640,750 B2 * | 11/2003 | Rowe et al. .................. | 119/706 |
| 6,651,591 B1 * | 11/2003 | Chelen ......................... | 119/707 |
| 6,662,751 B1 * | 12/2003 | Rutter .......................... | 119/400 |
| 6,743,072 B2 * | 6/2004 | Nelson et al. ................ | 446/490 |
| 6,966,277 B2 * | 11/2005 | DeRaspe-Bolles et al. .. | 119/706 |
| D513,546 S | 1/2006 | Comerford | |
| D555,300 S * | 11/2007 | Tsengas ....................... | D30/160 |
| 7,621,235 B2 * | 11/2009 | Genitrini ...................... | 119/706 |
| 7,669,551 B2 * | 3/2010 | Lamstein ..................... | 119/28.5 |
| 7,867,143 B2 * | 1/2011 | Fenger-Eriksen ............ | 482/35 |
| 7,895,779 B2 * | 3/2011 | Schnuckle .................... | 40/417 |
| 7,900,584 B2 * | 3/2011 | Suring et al. ................. | 119/708 |

* cited by examiner

*Primary Examiner* — Yvonne Abbott
(74) *Attorney, Agent, or Firm* — Kyle Fletcher

(57) ABSTRACT

The spring-loaded dog toy includes a self-supporting stand composed of a generally vertical tube resting atop a flat base, and from which a generally horizontal extends atop said vertical tube to support a dog toy there from. The dog toy is usually a ball that attaches to a first spring, which is separated from a second spring via a ring stop. The second string traverses across the length of the horizontal tube and attaches at a rear end. The ring stop creates a biasing force upon the second spring. Upon pulling the dog toy and subsequent release, both the first spring and the second spring generate wild and random movement of the dog toy, which entertains and amuses a pet.

18 Claims, 5 Drawing Sheets

SPRING LOADED DOG TOY

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of dog toys, more specifically, a spring-loaded ball dog toy.

B. Discussion of the Prior Art

As will be discussed immediately below, no prior art discloses a spring-loaded dog toy that includes a self-supporting stand upon which a generally horizontal tube extends to support a dog toy; wherein the dog toy may be in the form of a ball that is attached to a first spring, which is in turn attached to a second spring; wherein the second spring includes a ring stop that engages an end of the tube and an opposite end of the second string traverses internally across said tube to attach to an opposite end of the tube; whereupon pulling of the dog toy will cause extension of both the first spring and the second spring which results in wild and random movement of the dog.

The Line patent (U.S. Pat. No. 5,575,241) discloses a device for amusing and exercising pets in which a ball is attached to a rope or cord that is secured to a post that is anchored into the ground. However, the device does not teach a dog toy that extends from a first spring, and a second spring that includes a ring stop, and which both work to provide wild movement of the dog toy therefrom when engaged by a dog.

The Lonsway patent (U.S. Pat. No. 6,575,119) discloses a dog amusement toy in which a ball is attached to a fixed portion of a house and will move either by rotating or springing and will allow a pet to exercise and extertain itself. However, the toy requires the use of a suspension mechanism and is not simply mounted to a stationary object and employ the use of two springs that collectively provide wild movement of the dog toy when engaged by a dog.

The Schramer patent (U.S. Pat. No. 5,924,387) discloses a floor-mounted pet toy with a spring arm with a ball or object attached to the top of which will provide resistance and retract the ball when the pet pulls on it. However, the pet toy does not use two springs that collectively provide wild movement of the pet toy via a dog.

The Renforth et al. patent (U.S. Pat. No. 6,318,300) discloses a pet toy with a ball or objects suspended from a rope or spring or similar material at the end of an extended arm which is secured to a wall to allows the pet to play alone. Again, the pet toy is not supported upon two springs which spring from one another as well as connect to astationary object to provide random movement when activated by a dog.

The Krietzman et al. patent (U.S. Pat. No. 5,829,391) discloses a toy with a ball attached to a flexible and spring-like extension which can be anchored to a static surface in home to allow a pet to exercise and play by itself. However, the toy requires the use of a door to be secured thereon as opposed to a specially-designed supporting stand.

The Comerford patent (U.S. Pat. No. Des. 513,546) illustrates a design for a pet toy that has a floor mounted base and a movable tether ball, which does not depict two springs that work to provide random movement of the pet toy.

While the above-described devices fulfill their respective and particular objects and requirements, they do not describe a spring-loaded dog toy that includes a self-supporting stand upon which a generally horizontal tube extends to support a dog toy; wherein the dog toy may be in the form of a ball that is attached to a first spring, which is in turn attached to a second spring; wherein the second spring includes a ring stop that engages an end of the tube and an opposite end of the second string traverses internally across said tube to attach to an opposite end of the tube; whereupon pulling of the dog toy will cause extension of both the first spring and the second spring which results in wild and random movement of the dog toy with respect to the stand, which amuses and entertains a dog. In this regard, the spring-loaded dog toy departs from the conventional concepts and designs of the prior art.

SUMMARY OF THE INVENTION

The spring-loaded, dog toy includes a self-supporting stand composed of a generally vertical tube resting atop a flat base, and from which a generally horizontal extends atop said vertical tube to support a dog toy there from. The dog toy is usually a ball that attaches to a first spring, which is separated from a second spring via a ring stop. The second string traverses across the length of the horizontal tube and attaches at a rear end. The ring stop creates a biasing force upon the second spring. Upon pulling the dog toy and subsequent release, both the first spring and the second spring generate wild and random movement of the dog toy, which entertains and amuses a pet.

It is an object of the invention to provide a dog toy that is mounted to a stand and of which when tugged upon by a dog will cause the dog toy to move in a random motion thereabout so as to entertain said dog.

A further object of the invention is to provide a dog toy in the form of a ball that extends from two springs.

A further object of the invention is to provide two springs that are separated by a ring stop, which causes multiple springing effects upon the dog toy.

A further object of the invention is to provide a horizontal pipe that houses one of the springs within.

These together with additional objects, features and advantages of the spring-loaded dog toy will be readily apparent to those of ordinary skill in the art upon reading the following detailed description of presently preferred, but nonetheless illustrative, embodiments of the spring-loaded dog toy when taken in conjunction with the accompanying drawings.

In this respect, before explaining the current embodiments of the spring-loaded dog toy in detail, it is to be understood that the spring-loaded dog toy is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the spring-loaded dog toy.

It is therefore important that the claims be regarded as including such equivalent construction insofar as they do not depart from the spirit and scope of the spring-loaded dog toy. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
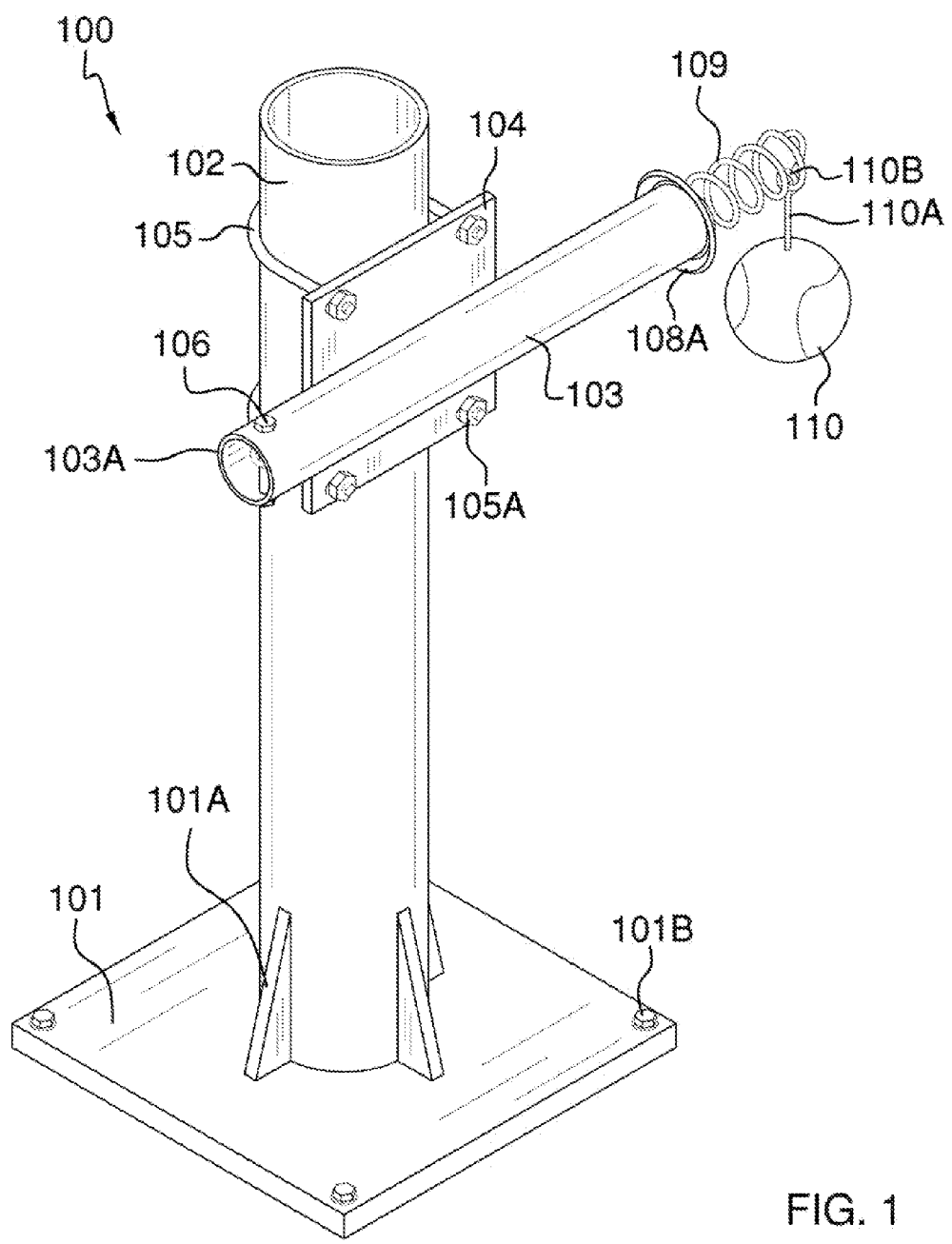
FIG. 1 illustrates a perspective view of the spring-loaded dog toy by itself and with the dog toy resembling a ball and in a rested state.
Figure 2:
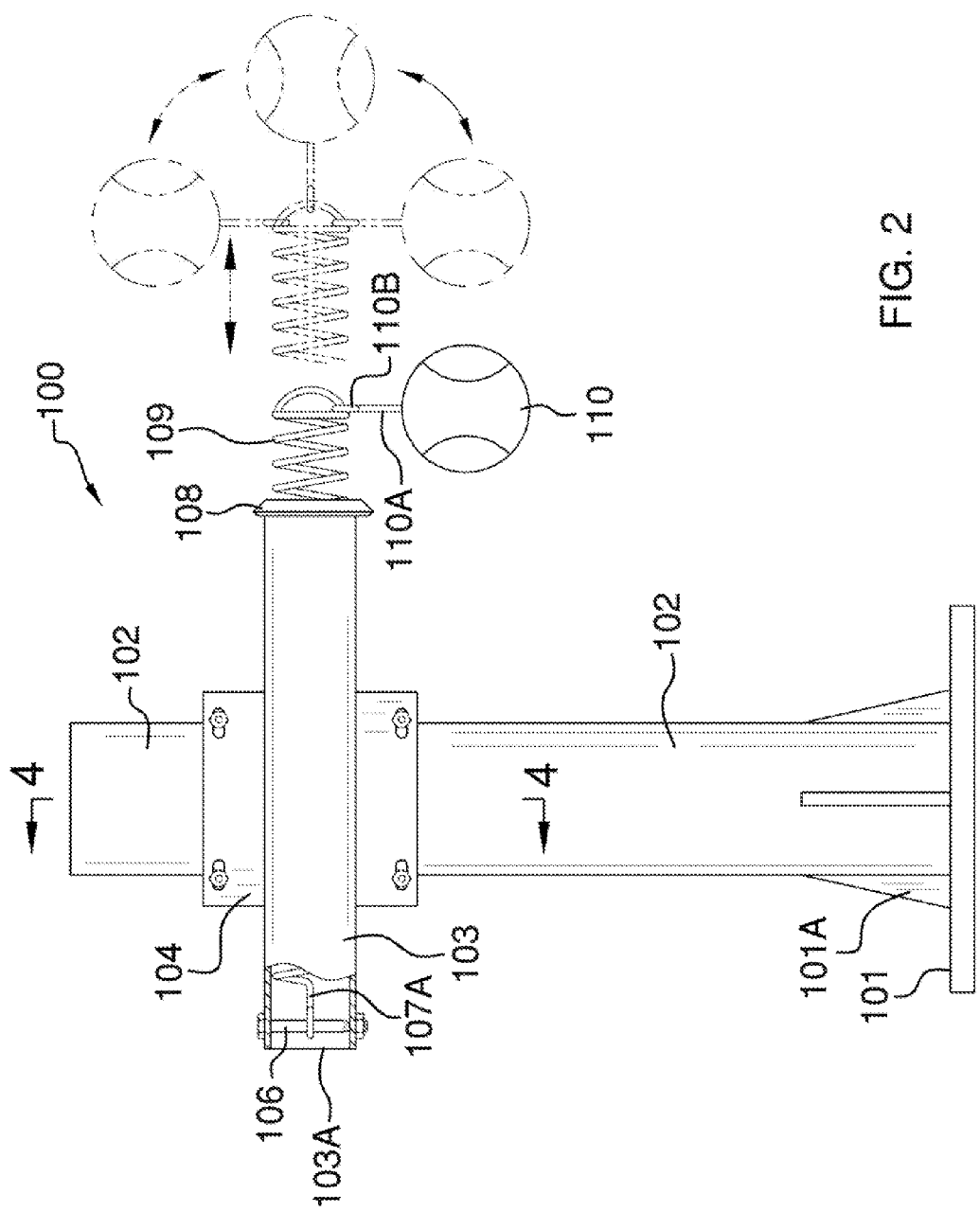
FIG. 2 illustrates a side view of the spring-loaded dog toy being pulled away from the stand and with the dog toy moving about the end of the first spring.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-6. A spring-loaded dog toy 10 (hereinafter invention) includes a support base 101 atop which a vertical tube 102 extends vertically. A horizontal tube 103 attaches at or near a top end 102A of the vertical tube 102 via a bracket 104 and U-bolts 105. The bracket 104 and U-bolts 105 enable the horizontal tube 103 to be adjusted with respect to the vertical tube 102. The bracket 104 is a flat member having multiple holes 104A that enable ends of the U-bolts 105 to pass through and upon which nuts 105A may be screwed thereon.

The support base 101 includes a plurality of gussets 101A that extend vertically along the outer periphery of the vertical tube 102, and which further support the vertical tube 102. The support base 101 may attach to a surrounding ground via fastening means 101B comprising bolts, rivets, screws, or stakes.

The horizontal tube 103 has a bolt 106 that crosses a rear end 103A of the horizontal tube 103. A second spring 107 attaches at a back end 107A to the bolt 106; whereas the remaining length of the second spring 107 traverses down the length of the horizontal tube 103. A ring stop 108 is attached to the second spring 107. More particularly, the ring stop 108 defines a front end 107B of the second spring 107. The ring stop 108 implies a biasing force upon the second spring 107, which is extended within the horizontal tube 103 such that upon pulling and releasing the ring stop 108, the second spring 107 would recoil backwards towards the rear end 103A of the horizontal tube 103. The ring stop 108 has a concave surface 108A that engages upon a front end 103B of the horizontal tube 103.

The invention 100 includes a first spring 109, which extends forward from the ring stop 108. The first spring 109 is visible from outside of the horizontal tube 103 at all times, and more particularly, the first spring 109 is merely an outward extension of the second spring 107 as divided by the ring stop 108.

Extending from a front end 109A of the first spring 109 is a dog toy 110. The dog toy 110 includes an arm 110A having an eyelet 110B, which attaches to the front end 109A of the first spring 109.

A dog 130 may come along and grab the dog toy 110, and pull away from the horizontal tube 103, at which time, the first spring 109 and the second spring 107 will extend. When the dog 130 tugs or pulls upon the dog toy 110, the dog toy 110 will move about in random motion with respect to both the horizontal tube 103 and the vertical tube 102. It shall be noted that the configuration of both the first spring 109 and the second spring 107 shall result in random motion of the dog toy 110, which entertains and amuses the dog 130. It shall be noted that the use of the ring stop 108 to divide the single spring into both the first spring 109 and the second spring 107 is a novel and nonobvious idea when used in conjunction with the dog toy 110.

It shall be noted that the dog toy 110 is depicted as a tennis ball or a ball for that matter. However, it shall be noted that other types of dog toys may be used with the invention 100, and shall provide random movement when engaged upon.

Figure 3:
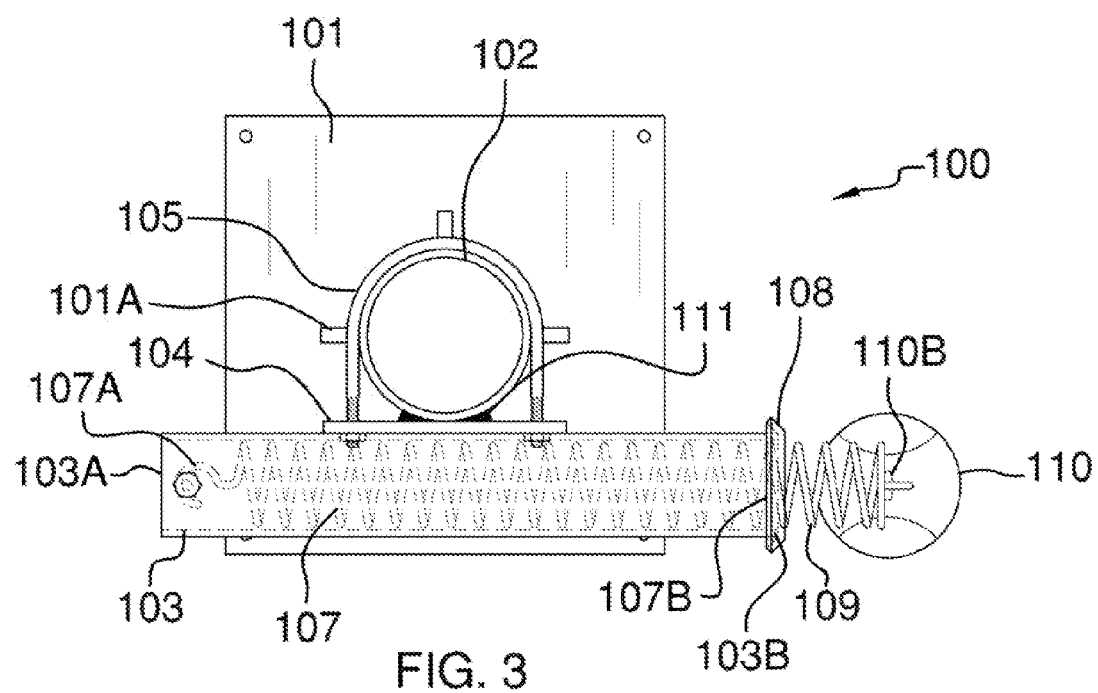
FIG. 3 illustrates a top view of the spring-loaded dog toy in which the second spring is depicted in broken lines and is located within the horizontal tube, and further detailing the bolt used to attach an end of the second spring opposite of the ring stop.
Figure 4:
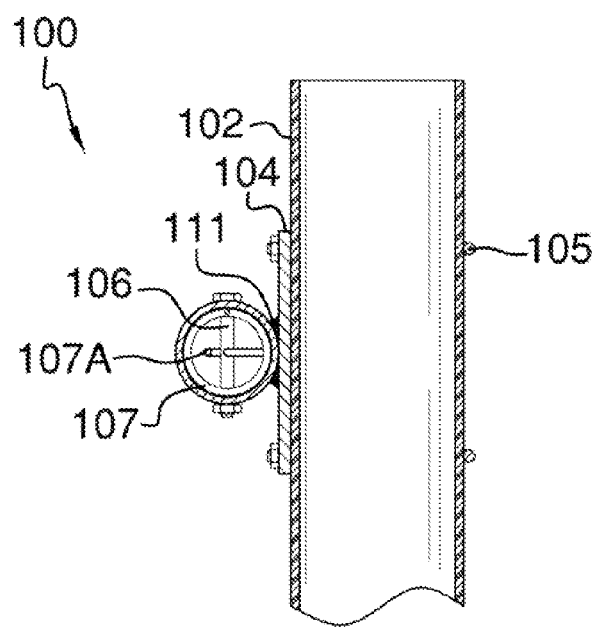
FIG. 4 illustrates a cross-sectional view of the spring-loaded dog toy along line 4-4 in FIG. 2, and depicting the horizontal rube with second spring located within.
Figure 5:
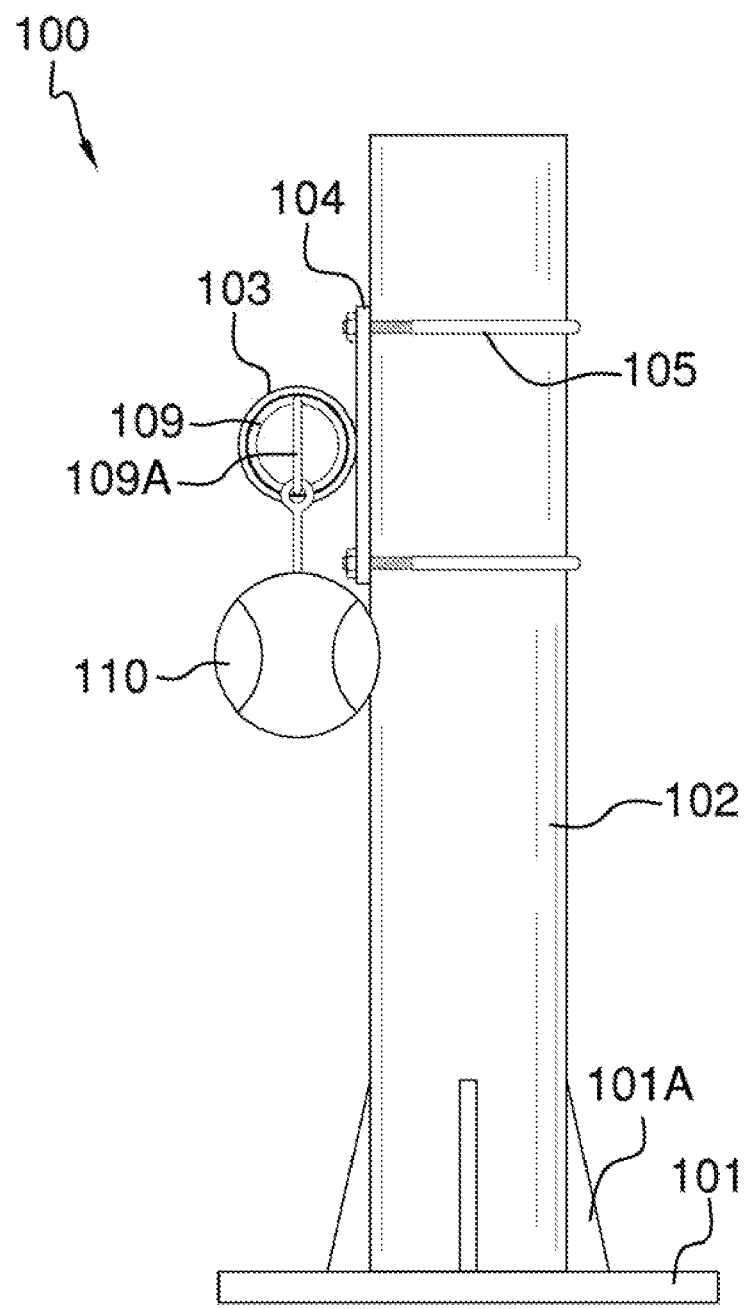
FIG. 5 illustrates a front view of the spring-loaded dog toy by itself.
Figure 6:
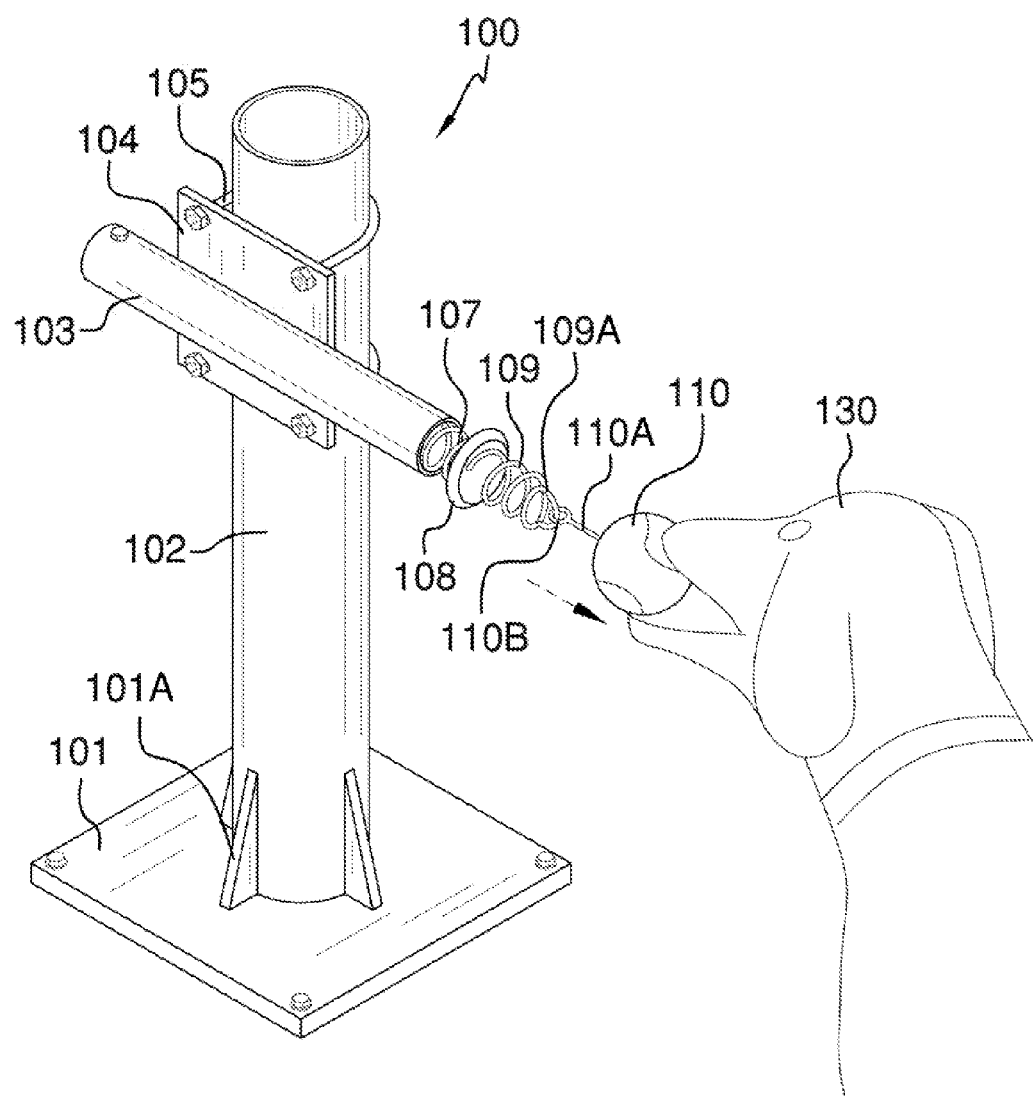
FIG. 6 illustrates a view of the spring-loaded dog toy in use with a dog whereby both the first spring and the second spring are elongated and the ring stop extended away from the horizontal tube.

In referring to FIGS. 3 and 4, a rubber block 111 may be seated between the vertical tube 102 and the bracket 104 (see FIG. 3) or in between the bracket 104 and the horizontal tube 103 (see FIG. 4). The rubber block 111 shall aid the invention 100 in minimizing damage associated with recoiling of either the first spring 109 or the second spring 107. More the point, the rubber block 111 may aid in keeping the bracket 104 at the desired elevation with respect to the vertical tube 102.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A spring-loaded dog toy comprising:
    a vertical tube extending from a support base and upon which a horizontal tube extends therefrom;
    wherein the horizontal tube houses a second spring that attaches to a bolt across a rear end and a ring stop defines a front end of the second spring;
    wherein a first spring extends from the ring stop and provides a place onto which a dog toy attaches;
    whereupon pulling the dog toy, said dog toy shall move in a random manner.

2. The spring-loaded dog toy as described in claim 1 wherein the support base includes gussets to support the vertical tube thereon.

3. The spring-loaded dog toy as described in claim 1 wherein the horizontal tube attaches to the vertical tube via a bracket and U-bolts.

4. The spring-loaded dog toy as described in claim 3 wherein the bracket is a flat member having multiple holes that nuts may be screwed thereon.

5. The spring-loaded dog toy as described in claim 1 wherein the support base attaches to a surrounding ground via fastening means comprising bolts, rivets, screws, or stakes.

6. The spring-loaded dog toy as described in claim 1 wherein the bolt crosses a rear end of the horizontal tube.

7. The spring-loaded dog toy as described in claim 6 wherein the second spring attaches at a back end to the bolt; whereas the remaining length of the second spring traverses down the length of the horizontal tube; wherein the ring stop is attached to the second spring; wherein the ring stop defines a front end of the second spring.

8. The spring-loaded dog toy as described in claim 7 wherein the ring stop has a concave surface that engages upon a front end of the horizontal tube.

9. The spring-loaded dog toy as described in claim 1 wherein the dog toy includes an arm having an eyelet, which attaches to the front end of the first spring.

10. The spring-loaded dog toy as described in claim 1 wherein a rubber block is positioned between the vertical tube and the bracket.

11. The spring-loaded dog toy as described in claim 1 wherein a rubber block is positioned between the bracket and the horizontal tube.

12. A spring-loaded dog toy comprising:
    a vertical tube extending from a support base and upon which a horizontal tube extends therefrom;
    wherein the horizontal tube houses a second spring that attaches to a bolt across a rear end and a ring stop defines a front end of the second spring;
    wherein a first spring extends from the ring stop and provides a place onto which a dog toy attaches;
    whereupon pulling the dog toy, said dog toy shall move in a random manner;
    wherein the support base includes gussets to support the vertical tube thereon;
    wherein the horizontal tube attaches to the vertical tube via a bracket and U-bolts;
    wherein the bracket is a flat member having multiple holes that enable ends of the U-bolts to pass through and upon which nuts may be screwed thereon;
    wherein the bolt crosses a rear end of the horizontal tube.

13. The spring-loaded dog toy as described in claim 12 wherein the support base attaches to a surrounding ground via fastening means comprising bolts, rivets, screws, or stakes.

14. The spring-loaded dog toy as described in claim 12 wherein the second spring attaches at a back end to the bolt; whereas the remaining length of the second spring traverses down the length of the horizontal tube; wherein the ring stop is attached to the second spring; wherein the ring stop defines a front end of the second spring.

15. The spring-loaded dog toy as described in claim 14 wherein the ring stop has a concave surface that engages upon a front end of the horizontal tube.

16. The spring-loaded dog toy as described in claim 12 wherein the dog toy includes an arm having an eyelet, which attaches to the front end of the first spring.

17. The spring-loaded dog toy as described in claim 12 wherein a rubber block is positioned between the vertical tube and the bracket.

18. The spring-loaded dog toy as described in claim 12 wherein a rubber block is positioned between the bracket and the horizontal tube.

* * * * *